United States Patent

[11] 3,566,731

| [72] | Inventor | Glover C. Ensley<br>420 E. 10th St., North Kansas City, Mo. 64106 |
|---|---|---|
| [21] | Appl. No. | 781,223 |
| [22] | Filed | Dec. 4, 1968 |
| [45] | Patented | Mar. 2, 1971 |

[54] BANDSAW, SUPPORT, AND DRIVE MECHANISM THEREFOR
5 Claims, 8 Drawing Figs.

[52] U.S. Cl................................................. 83/201.14,
143/19, 143/24, 143/46
[51] Int. Cl....................................................... B26d 1/48
[50] Field of Search............................................ 143/17.1,
19, 19.4, 19.5, 20, 24, 27, 46; 83/201, 201.14

[56] References Cited
UNITED STATES PATENTS

| 1,726,893 | 1929 | Grigsby.......................... | 143/19 |
| 2,556,670 | 1951 | Ashworth...................... | 143/19 |
| 2,596,081 | 1952 | Sacrey........................... | 143/19 |
| 2,928,439 | 1960 | Tester............................ | 143/19X |

Primary Examiner—William S. Lawson
Assistant Examiner—James F. Coan
Attorney—Fishburn, Gold and Litman ABSTRACT: A bandsaw has a housing enclosing power operated drive means operatively engaging a saw blade driving member spaced from a driven member and an endless blade engaging the driving and driven members. A mounting bracket is secured to the housing and to a support structure and has a support member having spaced ears mounted on and extending upwardly from the support member to pivotally receive an arm secured to the housing. The arm has a planar portion for engaging an abutment portion extending outwardly from the spaced ears for supporting the band saw in a substantially upright position. A motor within the housing rotates a drive shaft having a pinion gear operatively engaging a helical gear on a worm gear shaft whereby same is rotated and a worm gear thereon operatively engages a helical gear on a driving member shaft whereby the driven member is rotated thereby driving the endless blade.

Patented March 2, 1971

INVENTOR.
GLOVER C. ENSLEY

BY
*Fishburn, Gold & Litman*

ATTORNEYS

Patented March 2, 1971

INVENTOR.
GLOVER C. ENSLEY

BY
Fishburn, Gold Litman

ATTORNEYS

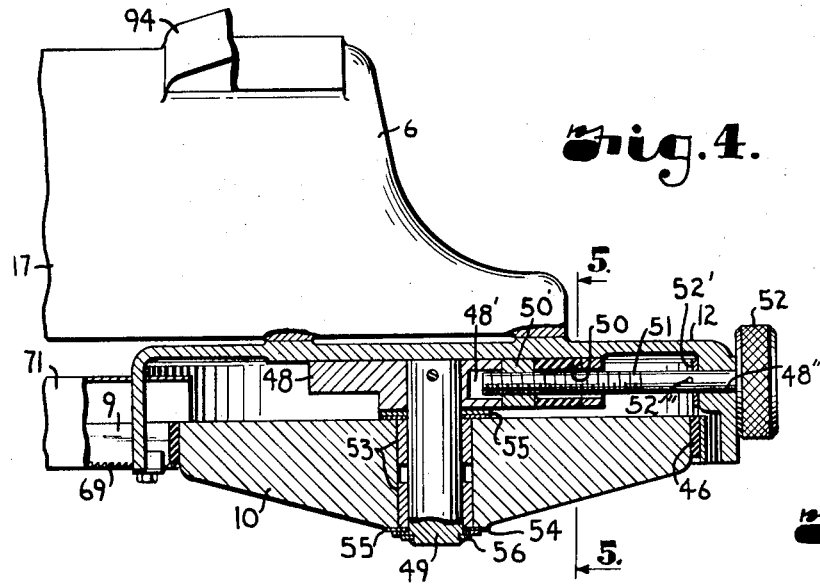
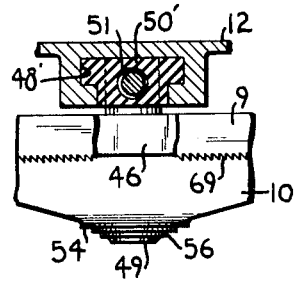
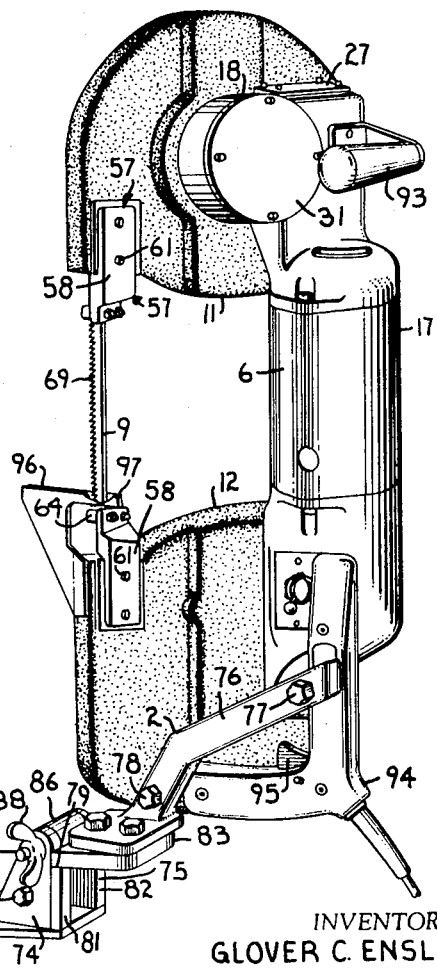
INVENTOR
GLOVER C. ENSLEY
BY
Fishburn, Gold & Litman
ATTORNEYS

BANDSAW, SUPPORT, AND DRIVE MECHANISM THEREFOR

This invention relates to bandsaws and more particularly to bandsaws having novel drive mechanism and a support bracket for supporting the saw in a substantially upright position.

The principal objects of the present invention are: to provide a bandsaw mounted on a novel supporting bracket adapted to support the bandsaw in substantially an upright position; to provide novel blade tilting members for tilting a portion of an endless saw blade between spaced apart portions of a housing having a driving member and a driven member therein respectively whereby the bandsaw will cut an elongate member intermediate its ends; to provide such a bandsaw and supporting bracket wherein the blade cuts substantially transverse to the longitudinal axis of the member being cut while the bandsaw is supported at a substantial angle with the longitudinal axis of the member being cut whereby a relatively large member may be cut; to provide such a bandsaw having novel blade tensioning means; to provide such a bandsaw having a tilted blade which is portable; and to provide such a bandsaw and supporting bracket which is economical to manufacture, safe in operation, durable in use, positive in operation and easily maintained.

Other objects and advantages of this invention will become apparent from the following description taken in connection with the accompanying drawings wherein are set forth by way of illustration and example certain embodiments of this invention.

FIG. 4 is a fragmentary longitudinal sectional view through the bandsaw taken on line 4-4, FIG. 1 showing blade tensioning means.

FIG. 5 is a transverse sectional view through the blade tensioning means taken on line 5-5, FIG. 4.

FIG. 8 is a perspective view of the bandsaw supported in substantially an upright position.

Figure 1:
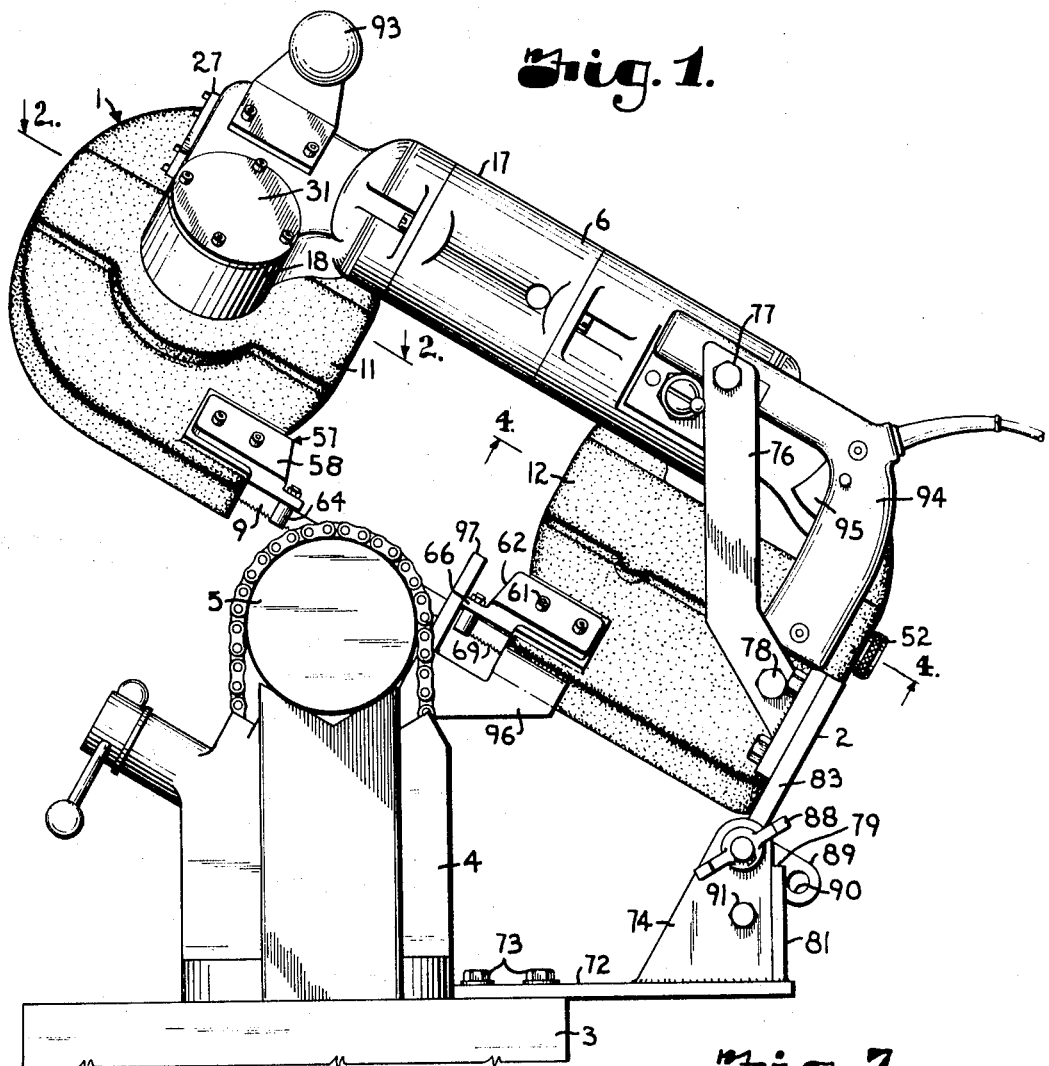
FIG. 1 is an elevational view of a bandsaw and a saw mounting bracket embodying features of the present invention.
Figure 6:
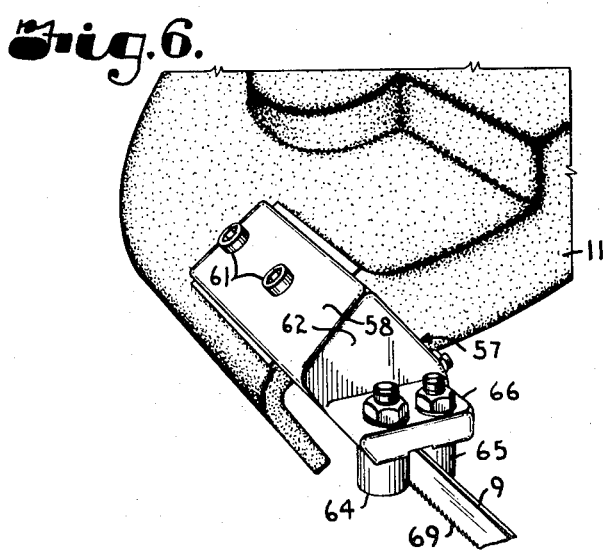
FIG. 6 is a fragmentary perspective view of blade tilting members.
Figure 7:
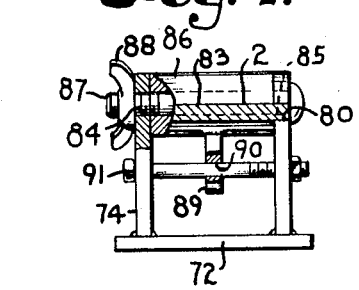
FIG. 7 is a fragmentary elevational view of a mounting bracket with portions broken away to better illustrate the component parts.
Figure 2:
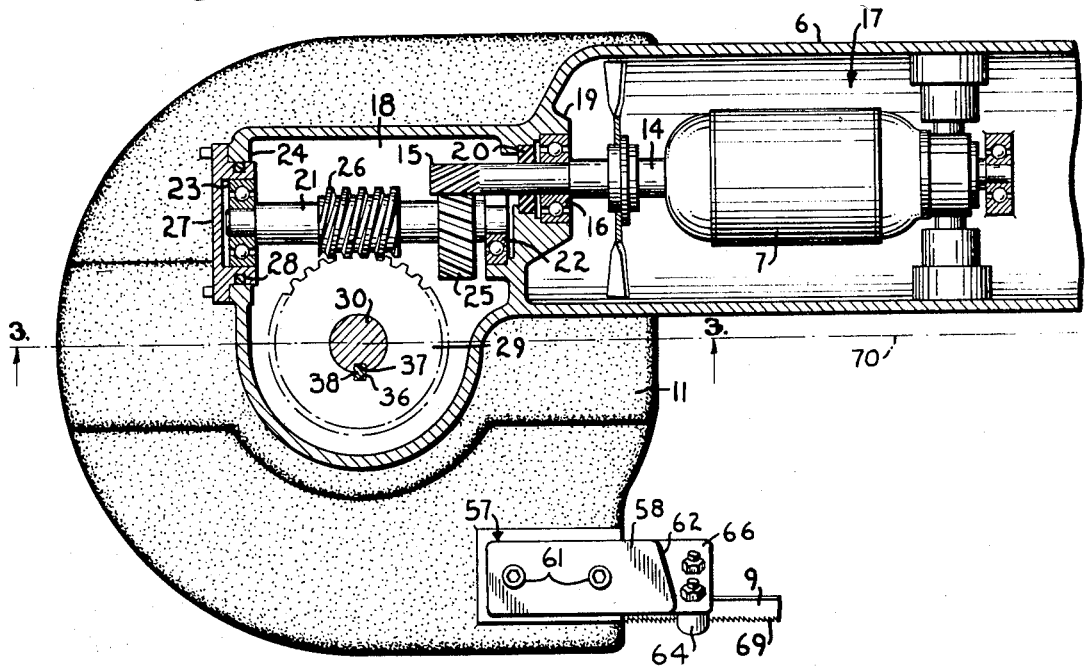
FIG. 2 is a fragmentary horizontal sectional view through the bandsaw taken on line 2-2, FIG. 1 showing drive means for driving a saw blade.
Figure 3:
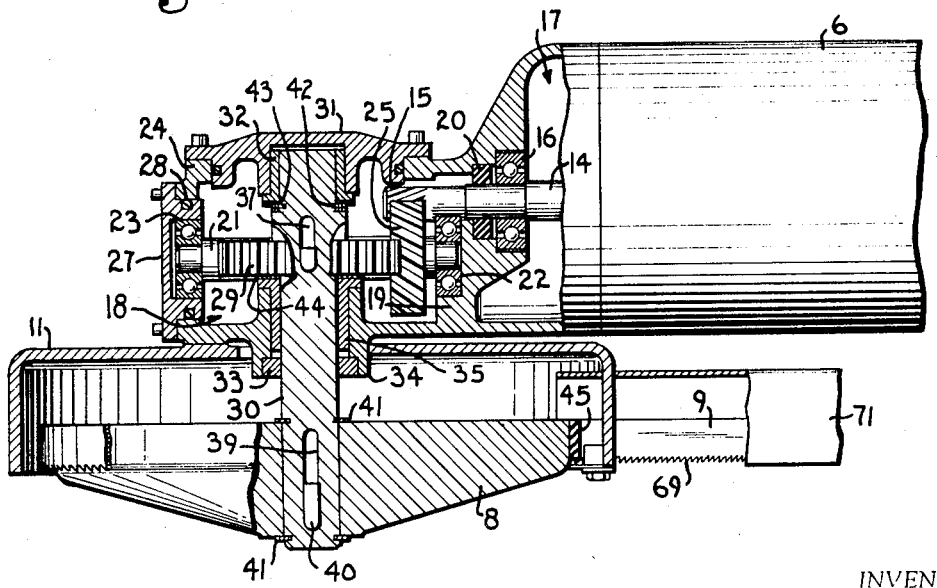
FIG. 3 is a fragmentary longitudinal sectional view through the bandsaw taken on line 3-3, FIG. 2 showing the drive means.

Referring more in detail to the drawings:

The reference numeral 1 generally designates a bandsaw secured to a mounting bracket 2 extending outwardly from a support structure 3 having a clamping device 4 thereon for engaging a member 5 to be cut. The bandsaw 1 includes a housing 6 having a suitable motor 7 therein operative to rotate a driving wheel 8 and an endless blade 9 engages the driving wheel 8 and a driven wheel 10. The driving wheel 8 and the driven wheel 10 are protected by spaced wheel guards 11 and 12 respectively.

The motor 7 is operative to rotate a drive shaft 14 extending outwardly therefrom and having a pinion gear 15 on the outstanding end. In the illustrated structure, the drive shaft 14 is rotatably supported intermediate its end by suitable bearings, such as sealed ball bearings 16.

The housing 6 is internally divided into a motor chamber 17 and a gear chamber 18 by an interior wall 19 and, in the illustrated structure, a suitable seal 20 is mounted in the interior wall 19 and engages the drive shaft 14 adjacent the sealed ball bearings 16.

A worm gear shaft 21 is rotatably mounted in the gear chamber 18 and has opposite ends rotatably supported by sealed ball bearings 22 and 23 in the interior wall 19 and in a housing end wall 24 respectively. The worm gear shaft 21 has a helical gear 25 adjacent the interior wall 19 for mating with the pinion gear 15 whereby rotation of the drive shaft 14 rotates the worm gear shaft 21. Intermediate the ends of the worm gear shaft 21 is an elongate worm gear 26 for driving the driving wheel 8, as later described.

An end plate 27 is removably mounted on the housing to close an opening in the end wall 24 to provide access to the gear chamber 18. The end plate 27 has a suitable seal, such as an O-ring 28, engaging the periphery thereof and the surface defining the opening in the end wall 24. In the illustrated structure, the end plate 27 has the sealed ball bearings 23 mounted therein for receiving one end of the worm gear shaft 21.

The worm gear 26 engages a helical drive gear 29 on an elongate drive wheel shaft or axle 30 mounted in and extending from the driving wheel 8 into the gear chamber 18. The drive wheel shaft or axle 30 is rotatably mounted in the gear chamber 18 of the housing 6. In the illustrated structure, the driving wheel 8 depends from the housing 6 and is at one end of the drive wheel shaft 30 and the other end of the drive wheel shaft 30 is rotatably supported in a top wall 31 of the gear chamber 18 by a suitable bearing, such as a flanged bearing 32. A suitable seal 33 is mounted in a bottom wall 34 and engages the drive wheel shaft 30 intermediate its ends. A suitable bearing, such as flanged bearing 35, is mounted in the bottom wall 34 and engages the drive wheel shaft or axle 30.

The helical drive gear 29 may be integral with the driving wheel shaft 30, however, in the illustrated structure, suitable slots 36 and 37 in the helical drive gear 29 and in the driving wheel shaft 30 respectively are adapted to receive a suitable key 38 therein to mount the helical drive gear 29 on the driving wheel shaft 30. In the illustrated structure, the driving wheel 8 is also removably mounted on the driving wheel shaft 30 by means of suitable slots 39 in the driving wheel 8 and in the driving wheel shaft 30 respectively for receiving a key 40. Suitable retainer rings 41 are mounted on the driving wheel shaft 30 and engage opposite faces of the driving wheel 8 thereby positioning same to be engaged by the endless blade 9. A retainer ring 42 is mounted on the driving wheel shaft 30 and engages the helical drive gear 29 to properly position same for mating engagement with the worm gear 26. Suitable thrust washers 43 and 44 are positioned between the helical drive gear 29 and the flanged bearings 32 and 35 respectively.

The driving wheel 8 and the driven wheel 10 each have an annular tire or rim 45 and 46 respectively preferably of a suitable resilient material such as rubber, plastic, or the like for engagement by the endless blade 9 whereby rotation of the driving wheel 8 effects travel of the endless blade 9 and thereby effects rotation of the driven wheel 10.

Proper tension is maintained in the endless blade 9 by adjusting the spacing between the driving wheel 8 and the driven wheel 10. A way 47 within the wheel guard 12 enclosing the driven wheel 10 is adapted to receive a slide member 48 for movement along the way 47. The slide member 48 has a driven wheel shaft 49 mounted thereon and depending therefrom with the driven wheel 10 rotatably mounted thereon.

The slide member 48 has a rectangular opening 48' therein which is fitted with a resilient compression member 50 and a slidable threaded member 50' which are sleeved on one end of a threaded shank 51. The compression member 50 is included to absorb shock between the wheel shafts when cutting. The other end of the threaded shank 51 is rotatably supported in the wheel guard 12 of the housing 6. A gripping portion 52 on the other end of the threaded shank 51 is positioned outside the wheel guard 12 and adapted to be grasped for rotation of the shank 51 whereby rotation of the threaded shank 51, when same is engaged within the slidable threaded member 50', is operative to move the slide member 48 along the way 47 thereby adjusting the spacing between the driven wheel 10 and the driving wheel 8.

The threaded end of the shank 51 is guided into the slide member 48 through a bore 48'' which communicates with the opening 48' therein. The shank 51 moves through the resilient compression member 50 and is arranged to threadedly engage within the slidable threaded member 50' which is sleeved on the shank 51.

Rotation of the shank 51 in one direction, as, for example, clockwise, will move the threaded slidable member 50' so as to exert pressure on and move the resilient compression member 50 into engagement with one face of the opening 48' within the slide member 48 thereby moving same and creating tension in the saw blade 9. Rotation of the shank 51 in the other direction, as, for example, counterclockwise, through a thrust pin 52' therein and washer 52'' sleeved thereon will exert pressure on the guard 12. The counterclockwise rotation of the threaded shank 51 will move the slidable threaded member 50' to engage an opposite face of the opening 48' within the slide member 48 to thereby remove tension from the saw blade 9 for ease of removal of same from the wheels 8 and 10.

Suitable sleeve bearings 53 are mounted on the driven wheel shaft 49 for rotatably mounting the driven wheel 10 on the driven wheel shaft 49. Suitable thrust washers 54 and 55 engage opposite faces of the driven wheel 10 and a retainer ring 56 is mounted on the driven wheel shaft 49 and engages one of the thrust washers, as, for example, washer 54.

A bandsaw having its blade moving substantially parallel to the longitudinal axis of the bandsaw will cut various members adjacent their ends, however, such a bandsaw and blade will not cut the members intermediate their ends therefore blade tilting members 57 are mounted on facing edges of the wheel guards 11 and 12. The blade tilting members 57 each include a body portion 58 suitably secured to the wheel guards 11 and 12 by suitable fastening devices, such as set screws 61. A flange 62 depends from the body portion 58 of the blade tilting members 57 and each support spaced blade engaging rollers 64 and 65. The rollers 64 and 65 are supported in a planar roller support 66 which is an outstanding projection from the flange 62. The blade engaging rollers 64 and 65 each engage the endless blade 9 and tilt a cutting edge 69 outwardly from an axis 70 extending axially through the driving wheel 8 and the driven wheel 10 with the axis 70 being transverse to the drive wheel shaft 30 and the driven wheel shaft 49.

The tilting portion of the endless blade 9 permits cutting of elongate members, such as pipe, bars, structural shapes, and the like transversely to their respective longitudinal axis and permits making the cut intermediate the ends thereof.

A blade guard 71 extends between the wheel guards 11 and 12 at the other edge of the bandsaw 1. The blade guard 71 is illustrated as an inverted U-shaped member with flanges extending below the cutting edge 69 of the endless blade 9 whereby when one edge of the bandsaw 1 has moved through the member 5 to be cut, the blade guard 71 at the other edge of the bandsaw 1 will engage a portion of the member 5 thereby preventing cutting or marring the surface thereof.

The mounting bracket 2 is adapted to position the tilted portion of the blade 9 substantially perpendicular to the member 5 and includes a support member 72 having one end suitably mounted on and secured to the support structure 3, as by a plurality of screws or bolts 73. The support member 72 may be any suitable substantially rigid member, such as a structural steel plate, channel, angle, beam, or the like. Mounted on the other end of the structural support member 72 are spaced apart upstanding ears 74 and 75 for pivotally supporting an arm 76 secured to the bandsaw 1.

The arm 76 is pivotally mounted on the ears 74 and 75 and is secured to the bandsaw housing 6 by suitable fastening devices, such as screws 77 and 78. The ears 74 and 75 each have an abutment portion 79 and 80 respectively extending outwardly from a rear edge 81 and 82 of the ears 74 and 75 respectively. The arm 76 has a planar portion 83 adjacent the pivotal mounting on the ears 74 and 75 for engaging the abutment portions 79 and 80 whereby said bandsaw 1 is supported in substantially an upright position, as shown in FIG. 8.

In the illustrated structure, the ears 74 and 75 each have coaxial bores 84 and 85 respectively and the planar portion 83 has a sleeve or tubular portion 86 at one edge which is adapted to be coaxially aligned with the bores 84 and 85 to receive a suitable fastening device, such as a bolt 87, which is secured in the ears 74 and 75 and sleeve portion 86 by a suitable fastener, such as a wing nut 88. An elongate bar 89 has one end mounted on the sleeve or tubular portion 86 and extends outwardly therefrom for movement between the ears 74 and 75. The bar 89 has a bore 90 therethrough adjacent the other end and when the planar portion 83 is in engagement with the abutment portions 79 and 80, the bore 90 is positioned to receive a suitable fastening device, such as a bolt 91, extending through at least one of the ears 74 and 75 in spaced relation with the bolt 87.

The bandsaw 1 may be detached from the arm 76 by removing the screws 77 and 78 thereby providing a portable bandsaw. The portable bandsaw includes a handle or gripping member 93 mounted on the housing 6. In the illustrated structure, the handle 93 is mounted on the top wall 31 of the gear chamber 18. A handle assembly 94 is mounted on the housing 6 at the other end thereof and includes a trigger 95 for activating the motor 7.

When used as a portable bandsaw, it is necessary to include a stop member 96 having a bar 97 positioned immediately adjacent to the roller support 66 of the blade tilting member 57 mounted on the wheel guard 12. The stop bar 97 thereby protects the spaced rollers 64 and 65 from being forced into engagement with the member 5 being cut.

It is to be understood that one form of this invention has been illustrated and described, but it is not to be limited to the specific form or arrangement of parts herein described and shown.

I claim:

1. A bandsaw comprising:
    a. a housing having drive means therein;
    b. a saw driving member rotatably mounted in said housing and operatively connected to said drive means;
    c. a source of power operatively connected to said drive means for rotating said saw driving member;
    d. an endless blade engaging said driving member;
    e. a driven member rotatably mounted in said housing and spaced from said saw driving member and engaged by said endless blade;
    f. blade tensioning means operatively connected to said driven member;
    g. blade tilting means whereby an elongate member may be cut intermediate its ends;
    h. a support structure;
    i. a support member mounted on said support structure and extending outwardly therefrom;
    j. spaced ears mounted on said support member and extending upwardly therefrom;
    k. an arm pivotally mounted on said ears, said arm engaging said bandsaw housing and being secured thereto;
    l. a bar mounted on said arm, said bar being between said ears; and
    m. a fastening device extending through said bar and at least one of said ears for securing said bar in a selected position relative to said ears whereby said bandsaw is supported in a selected position.

2. A portable bandsaw comprising:
    a. a housing having a motor therein, said motor being operative to rotate a drive shaft extending outwardly therefrom and having a pinion gear thereon, said housing having saw driving means therein, said saw driving means having a rotatably supported worm gear shaft having a helical gear adjacent one end thereof and a worm gear intermediate the ends thereof, said helical gear mating with said pinion gear on the motor drive shaft whereby said worm gear shaft is rotated;
    b. and endless blade for cuttingly engaging a member to be cut;

c. a saw driving member rotatably mounted in one portion of said housing and operatively connected to said drive means, said driving member having a driving member shaft rotatably supported in said housing and mounted in said saw driving member and extending outwardly therefrom and having a helical gear thereon, said helical gear on said driving member shaft mating with said worm gear whereby said driving member shaft and said saw driving member are rotated thereby driving said endless blade;

d. a driven member rotatably mounted in an other portion of said housing and spaced from said saw driving member and engaged by said endless blade, said other portion of said housing being spaced from said one portion of said housing;

e. blade tensioning means operatively connected to said driven member and including a way in said portion of said housing having said driven member therein, a slide member movable along said way and having an opening therein, a threaded shank rotatably supported in said housing portion and received in said opening in said slide member, a sleeve member within said opening in said member and threadedly engaged on said threaded shank for moving therealong, a resilient compression member within said opening in said slide member and sleeved on said threaded shank and engageable with said sleeve member and said slide member to tension said endless blade, and shaft mounted on said slide member and extending outwardly therefrom, said shaft having said driven member rotatably mounted thereon whereby said driven member is adjustable relative to said driving member;

f. gripping means mounted on said housing for lifting and holding said bandsaw; and g. a stop member mounted on said outer portion of said housing for engaging the member to be cut whereby said bandsaw blade is positioned to engage the member to be cut.

3. A portable bandsaw as set forth in claim 2 including:
a. a support structure;
b. a support member mounted on said support structure and extending outwardly therefrom;
c. spaced ears mounted on said support member and extending upwardly therefrom;
d. an arm pivotally mounted on said ears, said arm engaging said bandsaw housing and being secured thereto;
e. a bar mounted on said arms, said bar being between said ears; and
f. a fastening device extending through said bar and at least one of said ears for securing said bar in a selected position relative to said ears whereby said bandsaw is supported in a selected position.

4. A bandsaw comprising:
a. a housing having drive means therein, said housing having spaced portions depending therefrom;
b. a saw driving member rotatably mounted in one of said depending portions of said housing and operatively connected to said drive means;
c. a source of power operatively connected to said drive means for rotating said driving member;
d. a driven member rotatably mounted in the other of said depending portions of said housing;
e. an endless blade engaging said driving and driven members and extending between said depending portions of said housing, one run of said blade being below said housing and cutting run of said blade being farthest from said housing;
f. resilient blade tensioning means operatively connected to said driven member;
g. blade tilting means mounted on each of said depending portions of said housing and positioned to engage said blade during the cutting run thereof;
h. means engaging the depending portion of said housing having said driven member therein for supporting the bandsaw for movement between a cutting position and a substantially upright position; and
i. means associated with said bandsaw supporting means for securing the bandsaw in a selected position.

5. A bandsaw as set forth in claim 4 wherein said bandsaw supporting and securing means include:
a. a support structure having a support member mounted thereon and extending outwardly therefrom;
b. spaced ears mounted on said support member and extending upwardly therefrom, said ears each having an abutment portion extending outwardly therefrom;
c. an arm pivotally mounted on said ears, said arm engaging said bandsaw housing and being secured thereto, said arm having a planar portion adjacent the pivotal mounting on said ears for engaging said abutment portion of each of said ears, said planar portion of said arm and abutment portion of each of said ears being positioned to support the bandsaw in a substantially upright position;
d. a bar mounted on said arm for movement between said ears; and
e. a fastening device extending through said bar and at least one of said ears for securing said bar in a selected position relative to said ears whereby the bandsaw is supported in a selected position.